June 1, 1965 W. TRAUTNER ETAL 3,187,171

ELECTRIC LAMP ASSEMBLY AND MOUNTING

Filed June 4, 1962 2 Sheets-Sheet 1

INVENTORS
WAGN TRAUTNER &
BY DON R. ARMACOST

Fishburn & Gold
ATTORNEYS

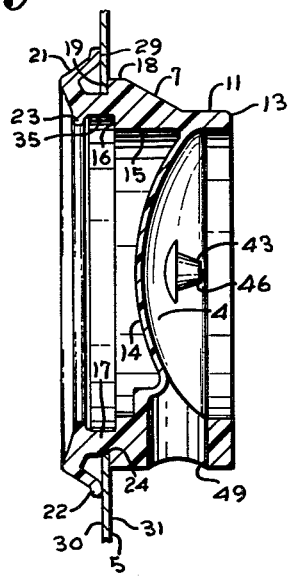
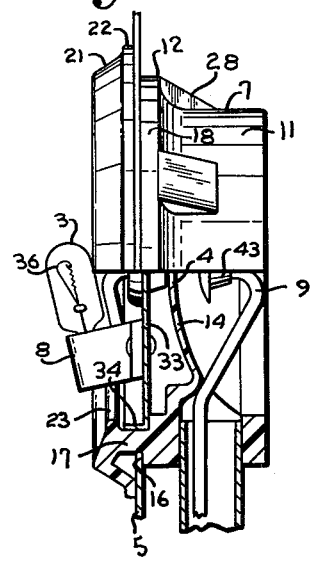
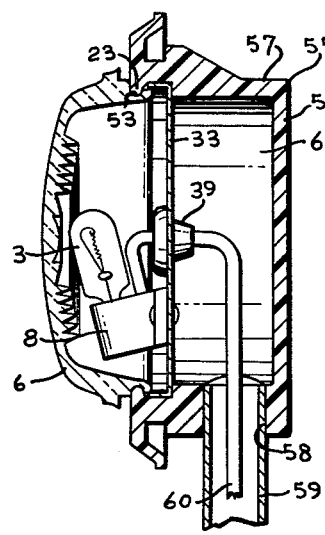
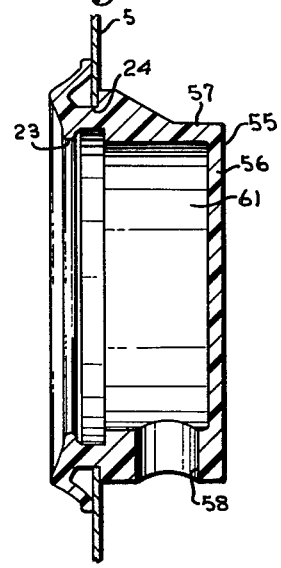
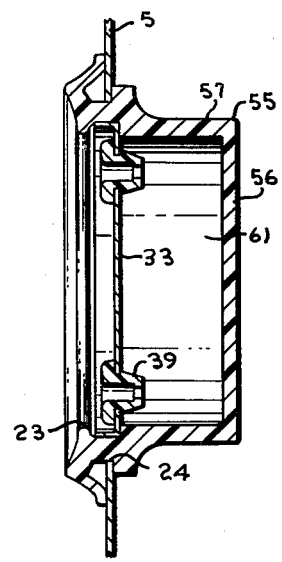

United States Patent Office 3,187,171
Patented June 1, 1965

3,187,171
ELECTRIC LAMP ASSEMBLY AND MOUNTING
Wagn Trautner, Overland Park, and Don R. Armacost, Mission Hills, Kans., assignors to Peterson Manufacturing Company, Kansas City, Mo., a corporation of Missouri
Filed June 4, 1962, Ser. No. 199,979
11 Claims. (Cl. 240—7.1)

This invention relates to electrical apparatus housings and mountings therefor, and more particularly to lamp assemblies and mountings for use on vehicles and the like.

Electrical devices enclosed in housings, as for example, lamp structures having electric bulbs therein such as used on vehicles, trucks, trailers and the like are exposed to the elements but also are exposed under extreme hardship such as created by fast moving vehicles under inclement weather, and it is desirable that such lamps be constructed and mounted with needed factors of sealing said lamps and adjacent portions of the vehicles against the elements. Also, when the bulbs are energized, heat is created in the housing, increasing the pressure therein and tending to force air from the housing interior. When the circuit to the bulb is interrupted, the temperature of the unit begins to drop, reducing the pressure in the unit so that outer atmosphere is drawn into the housing. This breathing action results in foreign material such as moisture, dust and fumes entering into the housing, and such dust and the like can collect on the inner surfaces of the lamp lens and any reflectors and result in reduced efficiency or output of light from the lamp. Heretofore, in order to effect seals for portions of the lamp and portions of the vehicle on which it is installed against water and dust leakages, the lamps have been mounted on mounting pads usually of some soft resilient material to prevent water from seeping between the lamp housing and the vehicle body. It has been common practice to endeavor to seal the lamp housing from the elements by use of a lens gasket which is usually in the form of rubber or other soft resilient material which is brought to a stage of compression between the lens and the housing. It has been common practice to provide means for securing the lens to the housing by use of screws or similar fasteners and to use such mechanical fasteners for the mounting of the lamp to the vehicle, whereby the assembly and installation is time-consuming and the seals frequently ineffective. Also, in structures heretofore used, the seals have been ineffective in eliminating breathing.

The principal objects of the present invention are to provide an electrical unit housing assembly and mounting with effective seals for the housing and apertures into the structure on which the housing is mounted; to provide an electrical unit housing having a flexible wall portion of resilient material that yields and moves in response to change in pressure to alter the volume in the housing and maintain a substantial balance of the pressures internally and externally thereof; to provide an electric lamp assembly with a resilient yieldable wall portion in the housing to automatically vary the volume in response to pressure change from heat of the energized lamp whereby the lamp's interior air is confined and restricted and breathing eliminated; to provide a lamp assembly wherein the housing is recessed into the mounting with small outward projection; to provide such a structure wherein the lamp housing is formed of resilient material and a lens sealingly engaged therewith without auxiliary fasteners; to provide such a structure that is readily serviceable without manipulation of screws and similar mounting elements and without the use of any tools; to provide a lamp structure with a housing of resilient material adapted to be installed in an opening in a wall or panel with cooperating portions on said housing engaging said wall with a resilient compression engagement to secure said housing in sealed relationship to the wall opening; to provide such a structure with a rigid removable internal panel or strut in engagement with the resilient wall to hold same in engagement with the margins of the opening in the wall or panel in which the housing is mounted; to provide such a structure wherein the resilient housing has portions resiliently and sealingly engaging the lens to secure the lens to the housing wherein the lens-engaging portions and wall-engaging portions cooperate to hold the parts in mounted assembled relation; and to provide an electrical unit assembly such as a lamp assembly and mounting that is economical to manufacture, easily installed and serviced, and wherein the resilient portions absorb and dampen vibrations, shocks and the like which would otherwise be transmitted to the filament of the bulb and wherein the parts cooperate to substantially eliminate entry of foreign material into the housing.

Other objects and advantages of this invention will become apparent from the following description taken in connection with the accompanying drawings wherein are set forth by way of illustration and example certain embodiments of this invention.

FIG. 5 is a sectional view through the housing mounted in a wall panel.

FIG. 6 is a side elevation of the housing in a wall panel, with the bulb mounting and electrical conductors positioned therein, with portions broken away to illustrate the arrangement of the parts thereof.

FIG. 7 is a sectional view through a modified form of lamp assembly.

FIG. 8 is a sectional view showing the mounting of the modified form of lamp housing in a wall panel.

FIG. 9 is a sectional view showing the modified form of lamp housing mounted in a wall panel after installation of the rigid strut member therein.

Figure 1:
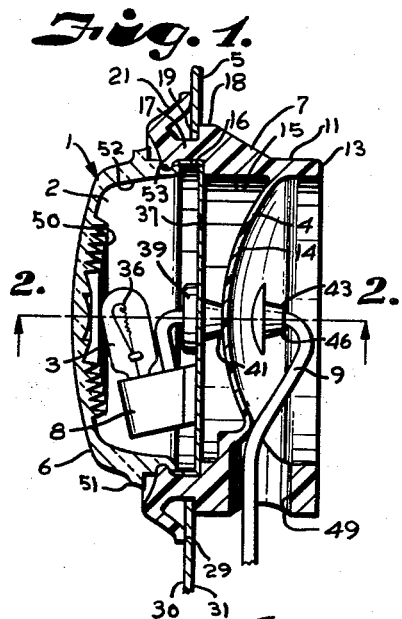
FIG. 1 is a sectional view through a lamp assembly and mounting embodying the features of the present invention.

Referring more in detail to the drawings:

The reference numeral 1 generally designates an electrical unit and housing assembly embodying the features of the present invention, and having a chamber 2 in which is located an electrical device 3 that when energized creates heat to increase the temperature in the chamber, the structure having a wall 4 of resilient flexible material that is yieldable in response to pressure to change the volumetric characteristics of the chamber 2 whereby when the wall portion 4 reaches a static balance, the pressure in the chamber 2 is substantially equal to the external atmospheric pressure to eliminate breathing in response to increase and decrease of the temperature in the chamber 2.

In the structure illustrated, the unit 1 is in the form of a lamp assembly mounted in operative position on a panel 5 which may be a portion of a side or back wall of a truck or trailer or other structure. The lamp assembly generally consists of a lens 6, a housing 7, an electrical device such as a bulb 3, a bulb socket 8 suitably supported in the housing with wire leads 9 and 10 extending from contacts (not shown) in the socket to a source of electrical energy. The housing 7 is preferably molded in one piece of resilient material such as rubber or suitable yieldable synthetic resin such as polyethylene, polyvinylchloride or other known yieldable plastics capable of deforming under stress and capable of automatic restoration to original form.

In the structure illustrated, the housing 7 includes a peripheral wall 11 and an outwardly extending annular wall portion 12 at the forward end of the peripheral wall, the peripheral wall extending rearwardly from the wall portion 12 and terminating in a rear end 13. The housing 7 is provided with a yieldable wall portion 4 which in the illustrated structure is a portion of a rear wall 14 that is preferably integral with the peripheral wall 11 and serves as a closure for the rear of the housing. In the illustrated structure, the rear wall 14 is spaced forwardly from the rear edge 13 of the peripheral wall and has the thin walled portion 4 that forms a diaphragm-like member normally dished inwardly and that is yieldable and flexible under pressure as later described. The peripheral wall 11 has an inner surface 15 forwardly of the rear wall 14 and has a forwardly facing shoulder 16 extending outwardly to a wall 17 that extends forwardly from annular wall portion 12. The wall portion 17 is spaced inwardly from the outer edge 18 of the annular wall portion 12 to define a ledge or forwardly facing surface 19. The peripheral wall portion 17 terminates forwardly in an outwardly and rearwardly extending peripheral flange 21 having an outer rearwardly facing marginal portion 22 with a face adapted to engage a panel 5 and cooperate with the ledge face 19 of the annular wall portion 12, as later described. The forward end portion of the wall 17 has an inwardly extending circumferential lip or rib 23 adapted to sealingly engage a portion of the lens 6, as later described.

The lamp assembly is adapted to be mounted in recessed relation to a panel 5 with said panel having an aperture 24 substantially corresponding in shape and size to the outer surface 25 of the wall 17 of the housing forwardly of the wall portion 12, said aperture also having a notched portion 26 for receiving an orienting or positioning lug 27 extending radially outwardly on the wall 17 of the housing. The panel 5 is usually of sheet metal and the like which may be in the nature of 1/16 of an inch thick or less. Also, the nature and the characteristics of the flexible housing are such that the peripheral wall portions 12 and 17 will flex to permit forcible entry of the wall portion 12 through the aperture 24. To aid in holding the housing in place after it is inserted in the panel 5, it is preferred that the housing have some rigidity as by spaced ribs 28 exteriorly of the wall 11 and rearwardly of the wall portion 12, as illustrated in FIG. 6. The forward portion or mouth of the housing as defined by the peripheral wall 17 will flex if pressure is applied thereto, and the outwardly and rearwardly extending portions 21 and 22 serve as a supporting flange which has its rear face 29 spaced outwardly from the wall portion 12 and preferably substantially in the same plane as the face 19 when in relaxed position. When the body of the housing is inserted through the aperture 24 and as the wall portion 12 is forced through the aperture, the surface 29 will engage the forward surface 30 of the panel 5 and said flange 21 will be compressed. When the forward face 19 of the wall portion 12 passes beyond the rear face 31 of the panel 5, the wall portion 12 will expand outwardly to form a ledge and the pressure exerted by the flange portion 21 will return the ledge face 19 into engagement with the rear face 31 of said panel, providing a firm engagement therewith, and the thickness of the panel causes the flange portion 21 to remain in a state of compression exerting continuous pressure on the face 29 against the forward face 30 of the panel, making a sealed joint against dust and moisture entering between the flange portion 21 and the panel 5.

A rigid lock member or strut 32 is adapted to engage the housing to hold the wall portion 17 whereby the housing will be retained in the panel 5. In the structure illustrated, the rigid strut member 32 is in the form of a metal disc or plate portion 33 having a peripheral shape and size substantially corresponding to the inner shape and size of the wall portion 17. The plate 33 has an outwardly extending peripheral flange 34 adapted to engage the surface 35 of the wall portion 17 with the plate portion 33 engaging the surface 16 at the forward end of the wall 11 of the housing body. In the structure illustrated, the bulb socket 8 is suitably mounted on the plate 33 whereby when the plate is positioned in the housing the bulb 3 located in the socket will have its filament 36 properly located relative to the lens 6 for desired distribution of light therefrom. In the structure illustrated, the plate 33 has a small aperture 37 for air movement therethrough. Also, the plate portion has spaced apertures 38 in which are mounted resilient bushings 39 or grommets having bores 40 for the respective conductors 9 and 10. In the illustrated structure, the bushings or grommets 39 have rearwardly extending portions with outer surfaces converging toward an end 41 with the portion of the bore 40 adjacent said rear end being smaller than the respective conductor extending therethrough whereby there is flexibility and tight gripping of the rear end portion of the bushings with the respective conductors to substantially form a seal therebetween and also support the conductors in a cushion mounting to reduce any shock that might be transmitted therethrough to the bulb socket 8. Also, the bushings protect the conductors from contact with the plate 33.

The rear wall 14 is spaced rearwardly from the member 32 and it is preferred that the apertures 38 for the bushings 39 are adjacent the side wall 11 and in alignment with conductor mounting portions 43 in said rear wall. In the structure illustrated, the members 43 are each spaced slightly inwardly as at 44 from the peripheral wall 11 and are connected thereto by a relatively thick portion as at 45 to adequately support the conductor receiving portions 43. The conductor receiving portions are in the form of rearwardly extending bosses having rearwardly converging rear ends 46 with bores 47 extending through the rear portion and of lesser size than the conductors whereby the bosses have resiliency and provide a tight gripping engagement of the rear portions with the insulated conductors 9 and 10 respectively to form a tight seal therewith. The forward portion of the bosses 43 are counterbored as at 48 larger than the conductor whereby the engagement between the conductor and the bosses is at the rear end portions.

It is preferred that at one side of the housing the peripheral wall 11 have a bore 49 through which the conductors that extend rearwardly from the wall 14 extend, it being preferred that the portions surrounding the bore 49 be of increased thickness whereby a conduit (not shown) may be connected thereto if desired. Except for the reinforced portion adjacent the bore 49 and the conductor receiving members 43, the rear wall 14 is preferably a thin diaphragm-like wall that is flexible and is movable toward and away from the plate 33 in response to pressure in the housing.

The lens 6 may be of any suitable transparent material such as an optical acrylic being non-yielding in characteristic and may be ribbed or otherwise internally formed as at 50 for desired distribution and pattern of light directed therethrough. In the illustrated structure, the lens 6 is substantially of semaphoric cross-section and has a peripheral flange 51 and a rearwardly extending peripheral wall or flange 52 extending generally parallel to the axis and having an inwardly extending circumferential groove 53 extending inwardly from a peripheral face 54. The peripheral wall or flange 52 rearwardly from the groove 53 is of lesser outer size to facilitate insertion of the lens into the housing 7. The groove 53 is of suitable size to receive the lip 23 of the housing, the root diameter of the groove 53 being larger than the inner diameter of the lip 23 when the housing and plate member are assembled in a panel, as illustrated in FIG. 6, whereby the lens may be inserted into the mouth of the housing with the inner portion of the wall 52 of the lens engaging the lip 23. Pressure on the lens toward the housing will flex the lip 23 and the supporting wall 17 thereof slightly outwardly until the groove 53 registers with the lip and the lip will enter therein and resiliently engage same in sealing engagement and provide a compression maintaining a positive seal against dirt, moisture and the like entering the housing chamber 2, said compression also holding the lens in assembled position as illustrated in FIG. 1.

In assembling a structure constructed as described, the socket 8 is secured to the plate member 33, the grommets or bushings 39 are positioned in the apertures 38, and the conductors 9 and 10 each have an end connected to the socket and the other ends extend through the bores of the bushings 39. The plate member may be positioned in the housing, and the lens applied, whereby it is engaged by the lip 23 to hold same together during shipping. To assemble the lamp in an aperture of the panel, as in the wall of a vehicle, the lens 6 is removed from the housing and then the plate member 32 with the socket 8 thereon is removed, the conductors 9 and 10 are inserted through the conductor receiving members 43 and then passed through the bore 48 to a source of electric current. Then the housing is aligned with the aperture 24 in the panel 2 with the orientation lug 27 aligned with the notch 26. The rear portion of the housing is then inserted through the aperture 24 until the outwardly extending wall portion 12 engages the panel edges at the aperture 24. Pressure is then applied on the housing to force the wall portion 12 through the aperture 24, said wall portion yielding to allow it to pass through until said wall portion is on the inside of the panel 5. During this movement, the flange portion 22 has the face 29 engaged with the outer face 30 of the panel 5 and is compressed and, after the wall portion 12 is snapped outwardly whereby the surface 19 thereof engages the surface 31 of the panel 5, pressure exerted by the flange 21 causes the housing to move outwardly to engage the surface 19 and the surface 29 with the opposite surfaces of the panel to form a compression to hold the housing in position and also provide a pressure seal against entry of dirt, moisture and the like between the housing and panel. The arrangement of the housing in the panel is particularly illustrated in FIG. 5 and, with the housing in this position, the strut or plate member 32 with the lamp socket thereon is inserted into the housing to the position illustrated in FIG. 6, holding the wall portion 17 outwardly into tight engagement with the edges of the panel defining the aperture 24 and positively anchoring the housing in the panel. The lens 6 is then moved into the mouth of the housing until the lip 23 of the housing engages in the groove 53 to anchor the lens on the housing in sealed engagement therewith to form the assembled relation of the parts, as illustrated in FIG. 1.

Figure 2:
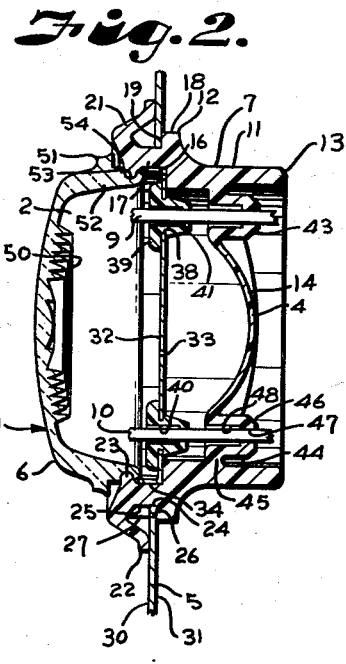
FIG. 2 is a sectional view through the lamp assembly and mounting taken on the line 2—2, FIG. 1.
Figure 3:
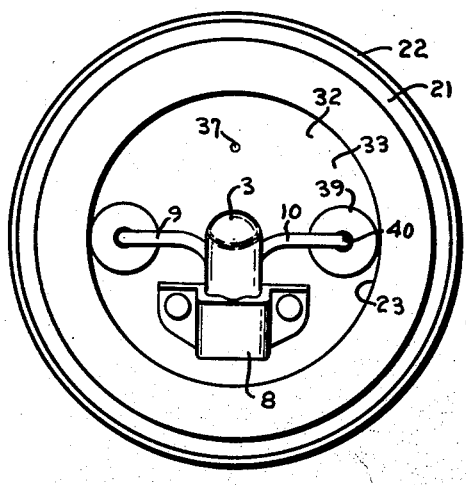
FIG. 3 is a front elevation of the lamp housing with the lens removed.
Figure 4:
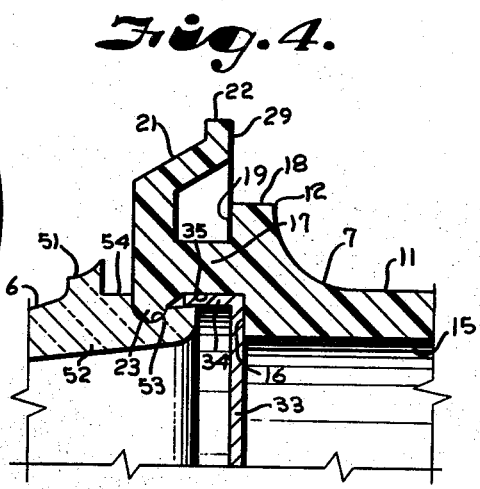
FIG. 4 is an enlarged fragmentary sectional view through the outer portion of the resilient housing and lens illustrating the sealed relationship thereof.

When the air in the chamber 2 is cold, the rear wall will tend to be positioned as illustrated in FIG. 1. When the lamp is connected in the circuit and energized, the heat created thereby will raise the temperature in the chamber 2, tending to increase the pressure of the air therein, said pressure being transmitted to the portion of the chamber rearwardly of the plate 33 through the aperture 37. The structure is such that it tends to automatically correct the volume to compensate for the expansion of the air in the chamber, as increase in pressure in the chamber tends to cause the flexible thin wall or diaphragm section of the rear wall to move, as for example, from an inwardly dished position as in FIG. 1 to an outwardly dished position as illustrated in FIG. 2, materially increasing the volume in the chamber, said wall flexing and continuing to flex and yield until it attains its own static balance where the pressure on both sides of said wall is equal or to a point where the interior pressure in the chamber 2 equals that of the exterior or atmospheric pressure. When the circuit to the bulb filament is interrupted and the lamp structure cools, the pressure in the chamber 2 will tend to be reduced, and the wall 14 will again assume its position, as illustrated in FIG. 1. With this arrangement, the lamp's interior air remains the same and is substantially confined and restricted and breathing is eliminated. This feature is also desirable when the lamp is used around volatile liquids because due to the elimination of the breathing no volatile or explosive vapor will enter the chamber unless the lens is removed.

The lamp structure does not depend upon any foreign aids or assistance for sealing the lens to the housing, such as normally supplied by gaskets, bezels, lens retainers, O-rings and the like, the entire housing being a monolithic unit with flexible characteristics and having its own lip section capable of both retaining and sealing the lens to the housing. It should also be noted that said lamp structure here disclosed provides a rigid plate for the purpose of retaining the bulb socket and that said rigid plate or strut also acts as a locking device whereby the lamp structure cannot be withdrawn from its mounted position in a vehicle body without first removing said reinforcing or rigid plate. It should also be noted that the lamp structure has been provided with a pair of conductor outlets each of which has been constructed in the form of a pair of tubular appendices, the outer aperture of which has been greatly restricted in diameter to provide a very tight and secure bondage between said housing and wire conductor. It should also be noted that the lamp structure is such that a wide choice of wall thicknesses for the panel 5 has been provided for and once the reinforcing strut or plate has been positioned in its seated and locked location rearwardly of the lip 23, the lamp housing can neither be accidentally removed nor rotated. It is to be understood that while the illustration shows the lamp in circular shape, it may be of other peripheral shapes such as square, rectangular or of compound shapes. Also, it is to be understood that the structure is adaptable for various types of lamp structures and it is not limited to signalling marker lights or the like.

In the form of the invention illustrated in FIGS. 7 to 9 inclusive, the housing 55 is a monolithic structure molded in one piece of resilient material such as rubber or suitable yieldable synthetic resin such as polyethylene, polyvinylchloride or other known yieldable plastics capable of deforming under stress and capable of automatic restoration to original form. The housing has a rear wall 56 with a side or peripheral wall 57 extending forwardly from the marginal portions thereof to form a bowl-like member. The forward portion of the housing is substantially the same as illustrated and described relative to the forward portion of the housing in the form of the invention illustrated in FIGS. 1 to 6 inclusive. The peripheral wall 57 has a bore 58 adapted to receive and resiliently engage a conduit 59 for enclosing conductors 60 which extend through the conduit into the interior 61 of the housing, and then through bores of bushings 39 mounted in a rigid reinforcing plate member 33 that is mounted in the housing to hold same in an aperture 24 of a panel 5 or the like. The lens 6 is mounted on the housing and the groove 53 therein is engaged with a lip 23 on the forward portion of the housing to enclose a bulb 3 mounted in a socket member 8 carried on the plate member 33 whereby the structure provides a resilient mounting for the housing and lens, the socket carrying member is also mounted in a resilient member whereby shocks are reduced thereto, and seals are provided between the housing and panel and between the housing and lens.

It is to be understood that while we have illustrated and described certain forms of our invention, it is not to be limited to the specific form or arrangement of parts herein described and shown except insofar as such limitations are included in the claims.

What we claim and desire to secure by Letters Patent is:

1. A lamp assembly comprising,
    (a) a housing member of resilient material and having a rear wall and an integral peripheral wall defining an opening spaced from said rear wall, said peripheral wall being of a thickness to normally retain its shape,
    (b) a light transmitting lens element, means forming a seal between said lens element and the peripheral wall to close the opening and cooperate with the housing walls to define a substantially sealed closed chamber that is subject to changing temperatures therewithin and resulting expansion and contraction of gases in the chamber,
    (c) a mounting member mounted within said chamber on said peripheral wall and spaced from said lens element and said rear wall and dividing said chamber into front and rear substantially enclosed chamber portions, a bulb socket mounted on said mounting member and adapted to support a light bulb between said mounting member and said lens element, said mounting member having an opening therein to permit passage of gases between said chamber portions, means adjacent said mounting member and on said peripheral wall for mounting said lamp assembly,
    (d) said rear wall having a thin normally inwardly dished unobstructed diaphragm section that is flexible and yieldable in response to changes in pressure between the interior and exterior of the chamber, said diaphragm section being bent outwardly in response to increase in pressure in the chamber resulting from increase of temperature therein to change the volume of the chamber and thereby substantially equalize the pressure internally and externally of said chamber to substantially eliminate a tendency for breathing across said seal.

2. A lamp assembly and mounting structure comprising,
    (a) a housing member having a rear wall with an integral forwardly extending peripheral wall of resilient material capable of deforming under stress and capable of automatic restoration to original form,
    (b) an outwardly extending ledge on said forward extending wall and having a forward face,
    (c) rigid means removably mounted in said housing and having a portion substantially extending around and engaging said peripheral wall inner surface adjacent said forward face to retain said peripheral wall against inward deformation,
    (d) an outwardly and rearwardly extending flange on said peripheral wall in forwardly spaced relation to said ledge face,
    (e) said flange terminating in a rearwardly facing margin adjacent a plane defined by the forward face of said ledge, and
    (f) a lens having a rearwardly extending peripheral wall portion engaged with the peripheral wall of said housing,
    (g) said housing peripheral wall being adapted for positioning in a panel aperture with the forward face of the ledge and the margin of the flange of the housing peripheral wall portion engaging opposite faces of said panel with said rigid means retaining the peripheral wall and ledge and flange in position to resiliently retain the housing mounted therein.

3. A lamp assembly and mounting as set forth in claim 2 which includes a bulb socket within the housing mounted on said removable rigid means.

4. A lamp assembly and mounting as set forth in claim 2 wherein the lens has an annular portion with an external circumferential groove extending within and engaging the housing peripheral wall, and inwardly extending circumferential lip means on said housing peripheral wall extending into the groove on the annular portion of the lens with a compressive sealing engagement.

5. A lamp assembly and mounting as set forth in claim 2 wherein the lens has an annular portion with an external forwardly facing circumferential shoulder extending within the housing peripheral wall, and inwardly extending circumferential lip means on said housing peripheral wall engaging said shoulder on the annular portion of the lens with a compressive sealing engagement.

6. A lamp assembly and mounting structure comprising,
    (a) a housing member having a rear wall with an integral forwardly extending peripheral wall of resilient material capable of deforming under stress and capable of automatic restoration to original form,
    (b) an outward peripheral ledge on said forwardly extending wall and having a forward face,
    (c) an outwardly and rearwardly extending flange on said peripheral wall in forwardly spaced relation to said ledge face,
    (d) said flange terminating in a rearwardly facing margin adjacent a plane defined by the forward face of said ledge,
    (e) a lens having a rearwardly extending peripheral wall portion received within the peripheral wall of the housing and having a circumferential groove in the portion within the peripheral wall of said housing,
    (f) an inwardly extending circumferential lip on said housing peripheral wall substantially in line with said flange and responsive to forces deforming said flange and resiliently engaging in the groove of the lens to retain the lens on the housing in sealed engagement therewith,
    (g) said housing peripheral wall being adapted for positioning in a panel aperture with the forward face of the ledge and the margin of the flange of the housing peripheral wall portion engaging opposite faces of said panel to resiliently retain the housing mounted therein and apply inward pressure at the lip engagement with the lens,
    (h) said lens cooperating with the housing walls to define a closed substantially sealed chamber,
    (i) a lamp bulb within the chamber and which when energized increases the temperature and thereby the pressure in the chamber,
    (j) said rear wall of the housing having a large thin diaphragm section that is flexible and yieldable to move in response to change in pressure for changing the volume in the chamber and maintaining a substantial balance of the pressure internally and externally of the chamber.

7. A lamp assembly and mounting structure comprising,
    (a) a housing member having a rear wall with an integral forwardly extending peripheral wall of resilient material capable of deforming under stress and capable of automatic restoration to original form,
    (b) a ledge on said forwardly extending wall and having a forward face outwardly thereof,
    (c) an outwardly and rearwardly extending flange on said peripheral wall in forwardly spaced relation to said ledge face,
    (d) said flange terminating in a rearwardly facing margin spaced outwardly from the ledge and adjacent a plane defined by the forward face of said ledge,
    (e) a lens having a rearwardly extending peripheral wall portion received within the peripheral wall of the housing and having a peripheral groove in the portion within the peripheral wall of said housing,
    (f) an inwardly extending circumferential lip on said housing peripheral wall substantially in line with said flange and responsive to forces deforming said flange and resiliently engaging the lens at the peripheral groove in the peripheral wall of said lens.

(g) said housing peripheral wall being adapted for positioning in a panel aperture with the forward face of the ledge and the margin of the flange of the housing peripheral wall portion engaging opposite faces of said panel to resiliently retain the housing mounted therein, and apply inward pressure at the lip engagement with the lens, (h) and rigid means having a portion substantially extending around and removably engaging the peripheral wall of the housing adjacent said forward face of said ledge to retain said wall and ledge against inward deformation.

8. A lamp assembly and mounting, in combination, (a) a flat panel having forward and rearward faces and an aperture extending therethrough, (b) a lamp housing having a peripheral wall of a size substantially corresponding to the aperture in the panel, said peripheral wall defining a front opening of said housing, (c) a lens sealingly engaged with said peripheral wall and closing said housing front opening, (d) an outwardly extending ledge on said peripheral wall in spaced relation to the forward edge thereof and having a forward face engaging the rearward face of said panel, (e) a flange on said housing peripheral wall in forwardly spaced relation to said panel and extending outwardly and rearwardly and terminating in a rearward margin sealingly engaging the forward face of said panel, and (f) rigid means having a portion substantially extending around and removably mounted in the housing in engagement with the peripheral wall inner surface adjacent said forward face of said ledge to retain said peripheral wall and said flange engaged with said panel.

9. A lamp assembly and mounting, in combination, (a) a flat panel having forward and rearward faces and an aperture extending therethrough, (b) a lamp housing having a peripheral wall of a size substantially corresponding to the aperture in the panel, said peripheral wall defining a front opening of said housing, (c) a lens sealingly engaged with said peripheral wall and closing said housing front opening, (d) an outwardly extending ledge on said peripheral wall in spaced relation to the forward edge thereof and having a forward face engaging the rearward face of said panel, (e) a flange on said housing peripheral wall in forwardly spaced relation to said panel and extending outwardly and rearwardly and terminating in a rearward margin engaging the forward face of said panel, (f) said resilient wall, ledge member and flange being of material capable of deforming under stress and capable of automatic restoration to original form with the rearward margin of said flange when in relaxed position being substantially in a plane of said forward face of the ledge and when the housing is positioned in a panel with the ledge engaging the rearward face thereof the flange is in compression and cooperates with the ledge to resiliently grip the panel in sealing engagement for retaining the housing mounted therein, and (g) rigid means having a portion substantially extending around and removably mounted in said housing and engaging the peripheral wall inner surface adjacent said forward face of said ledge to retain the wall, flange and ledge engaged with said panel.

10. A device of the character described comprising, (a) a housing member having a rear wall with an integral forwardly extending peripheral wall, said housing member being of resilient material capable of deforming under stress and capable of automatic restoration to original form, (b) an outwardly extending ledge on said forward extending wall and having a forward face, (c) rigid means removably mounted in said housing and having a portion substantially extending around and engaging said peripheral wall inner surface adjacent the forward face of said ledge to retain said peripheral wall and ledge against inward deformation, (d) an outwardly and rearwardly extending flange on said peripheral wall in forwardly spaced relation to said ledge face, (e) said flange terminating in a rearwardly facing margin adjacent a plane defined by the forward face of said ledge, (f) and a cover having a rearwardly extending peripheral wall of said housing in sealing engagement therewith and cooperating with the housing to define a closed chamber adapted to contain an electrical member which when energized increases the temperature in the chamber, (g) said housing peripheral wall being adapted to be positioned in a panel aperture with the forward face of the ledge and the margin of the flange of the housing peripheral wall portion adapted to engage opposite faces of said panel to resiliently retain the housing mounted therein, (h) said rear wall having a large thin normally inwardly dished diaphragm section that is flexible and yieldable to move in response to change in pressure in the chamber, said diaphragm section moving outwardly in response to increase in pressure in said chamber to change the volume of the chamber and maintain a substantial balance of the pressure internally and externally of the chamber.

11. A lamp assembly and mounting structure comprising, (a) a housing member having a rear wall with an integral forwardly extending peripheral wall of resilient material capable of deforming under stress and capable of automatic restoration to original form, (b) an outwardly extending ledge on said forwardly extending wall and having a forward face, (c) rigid means removably mounted in said housing and having a portion substantially extending around and engaging said peripheral wall inner surface adjacent said forward face to retain said peripheral wall against inward deformation, (d) an outwardly and rearwardly extending flange on said peripheral wall in forwardly spaced relation to said ledge face, (e) said flange terminating in a rearwardly facing margin adjacent a plane defined by the forward face of said ledge, and (f) a lens having a rearwardly extending peripheral wall portion engaged with the peripheral wall of said housing, (g) said housing peripheral wall being adapted for positioning in a panel aperture with the forward face of the ledge and the margin of the flange of the housing peripheral wall portion engaging opposite faces of said panel with said rigid means retaining the peripheral wall and ledge and flange in position to resiliently retain the housing mounted therein, (h) said lens cooperating with the housing walls to define a closed substantially sealed chamber, (i) a lamp bulb within the chamber and which when energized increases the temperature and thereby the pressure in the chamber, (j) said rear wall of the housing having a large thin diaphragm section that is flexible and yieldable to move in response to change in pressure for changing the volume in the chamber and maintaining a substantial balance of the pressure internally and externally of the chamber.

References Cited by the Examiner

UNITED STATES PATENTS

| | | | |
|---|---|---|---|
| 1,781,865 | 11/30 | Aniol | 240—8.2 |
| 2,529,135 | 11/50 | Camilli | 174—12 X |
| 2,766,796 | 10/56 | Tupper | 150—.5 |
| 2,809,283 | 10/57 | Spencer | 240—7.1 |
| 2,816,687 | 12/57 | Phillips | 220—85 |
| 2,903,570 | 9/59 | Worden | 240—8.2 X |
| 3,017,501 | 1/62 | Tantlinger | 240—8.3 X |
| 3,122,728 | 2/64 | Lindberg | 340—229 |

NORTON ANSHER, *Primary Examiner*.